Sept. 13, 1938.　　　C. M. WEINHOLD　　　2,129,894
CORN SHELLER
Filed Oct. 3, 1936
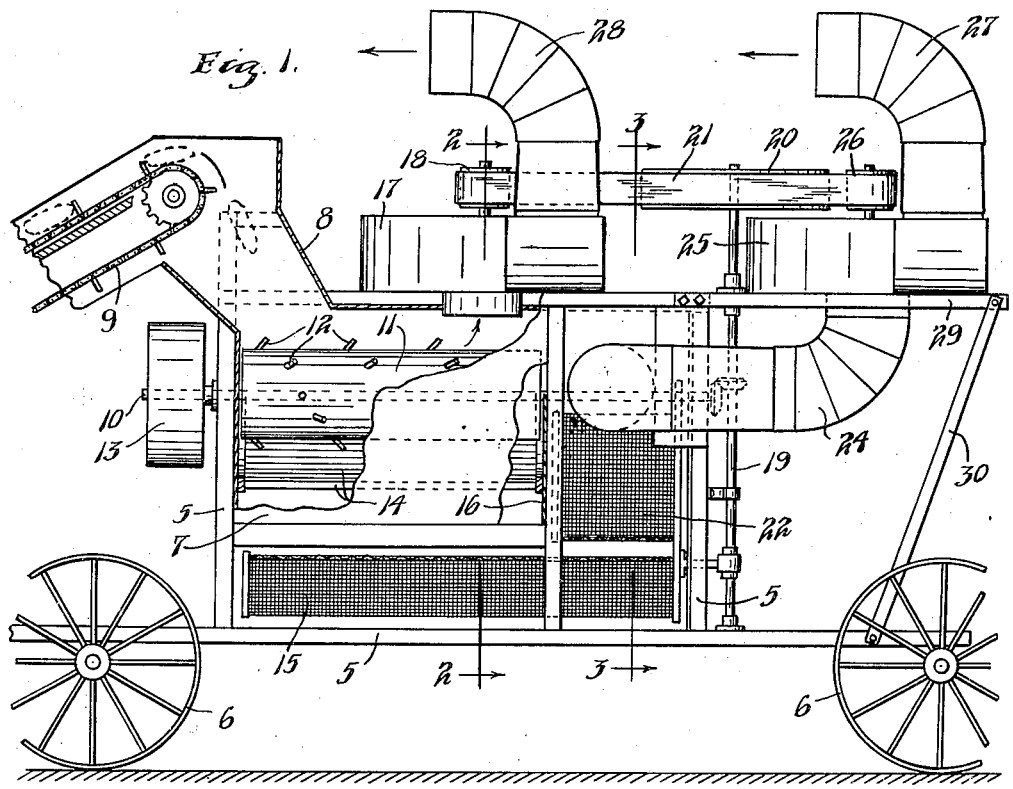
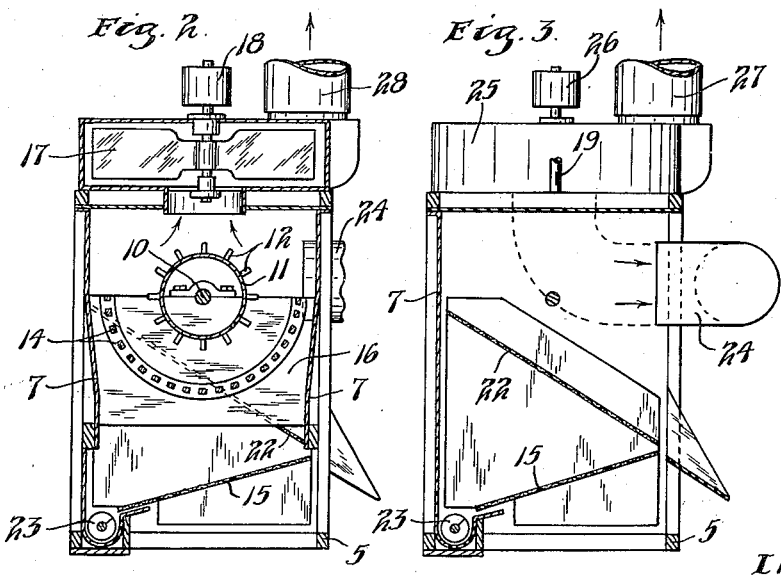
INVENTOR.
CLARENCE M. WEINHOLD.
BY HIS ATTORNEYS.
Williamson & Williamson Patented Sept. 13, 1938

2,129,894

UNITED STATES PATENT OFFICE 2,129,894

CORN SHELLER

Clarence M. Weinhold, Cottonwood, Minn.

Application October 3, 1936, Serial No. 103,894

4 Claims. (Cl. 130—6)

This invention relates to improvements in corn shellers, and more particularly to means for removing husks from corn cobs after the corn has been removed therefrom.

It is an object of my invention to provide a device which may be readily attached to the conventional type of corn sheller now being used.

Some of the corn shelling machines in use today are provided with suction blowers which are connected to the corn-shelling chambers of such machines, for the purpose of removing husks and other types of waste material while the corn is being removed from the cob. I find, however, that while a good deal of this waste material is removed by suction devices connected to the shelling chamber, there is still a considerable quantity of husks which remain on the cobs after the corn has been removed and the cobs are fed from the machine.

It is, therefore, a general object of my invention to provide means for removing the husks remaining on the corn cobs after the cobs have been removed from the corn-shelling chamber.

These and other objects and advantages of the invention will more fully appear from the following description, made in connection with the accompanying drawing, wherein like reference characters refer to the same or similar parts throughout the various views, and in which:—

Fig. 1 is a side elevation with some of the parts shown broken away;

Fig. 2 is a vertical section taken on the line 2—2 of Fig. 1; and

Fig. 3 is a vertical section taken on the line 3—3 of Fig. 1.

Referring to the drawing in more detail, I have shown a corn sheller with a frame 5 provided with wheels 6. Mounted in the framework, is a casing 7 which substantially encloses the forward part of the machine. An inlet chute 8 at the forward end of the casing 7 is adapted to receive the end of a suitable elevator 9 which feeds ears of corn to be shelled into the casing.

A horizontal shaft 10 is suitably journaled in the framework 5 and runs through the chamber 7. Mounted on this shaft within the chamber, is a cylindrical rotary member 11 which carries a plurality of hardened steel shelling teeth 12, which are arranged in spiral formation around the cylinder. A pulley 13 is provided on the end of the shaft 10 to permit the shaft to be driven by a power-operated belt.

Within the casing 7 and mounted below the toothed cylinder 11 is a plurality of grate bars 14. When corn is fed into the shelling-chamber 7, the rotating cylinder 11 with its teeth will cooperate with the grate bars to remove the kernels of corn from their cobs. The corn will fall through the spaces between the grate bars to a suitable cleaning screen 15. A partition 16, mounted in the rear end of the shelling chamber 7, extends vertically to a point approximately even with the height of the uppermost grate bars 14. When a certain number of cobs from which the corn has been removed are accumulated in the shelling chamber, the empty cobs will be fed from the shelling chamber over the top of said partition. The feeding of the cobs in this manner is induced partly by the spiral arrangement of the teeth 12 and partly by the fact that the empty cobs are lighter and will rise to the top.

During the shelling operation, a substantial amount of husks and other waste material will be removed from the shelling chamber by the suction fan 17, the shaft of which is provided with a pulley member 18. An extension of the horizontal shaft 10 is geared to a vertical drive shaft 19 which carries a drive wheel 20. A belt 21 connects the drive wheel to the pulley 18 on the suction device 17.

When the cobs with the corn removed fall from the mixing chamber 7 over the partition 16, they are customarily dropped onto a screen 22 which will remove any particles of corn which happened to stick to the cobs. These few pieces of corn drop through the screen 22 and are fed to a screw element 23, which will remove them from the machine.

I have found that in practical use of corn-shelling machines of this type, when the supposedly empty cobs come out of the machine, a considerable amount of husks remains on the cobs. For that reason, I have provided a conduit 24 which has an open end adjacent the cob outlet of the shelling chamber and substantially on a line with the top of the partition 16. This conduit leads to a suction device 25 which has a pulley 26 mounted on its rotary shaft. It will be noted that the pulley 26, the pulley 18 and the drive wheel 20 are in substantial alignment and in the same horizontal plane. Therefore, the belt 21 can be extended to form a driving connection for the pulley 26, as well as for the pulley 18. Suitable exhaust conduits 27 and 28 may be provided for conveying husks and other waste material from the two suction devices.

In the embodiment shown in the drawing, I can attach my cob-cleaning suction device 25 to a conventional corn sheller by providing horizontal frame extensions 29 and substantially vertical supporting members 30.

While the addition of an auxiliary suction device with a conduit leading from a point adjacent the cob outlet of the shelling chamber seems to be a relatively unimportant duplication of parts, this is not actually the case. I have stated above that, in the conventional machines in use today, the suction device connected to the shelling chamber will not function to remove all of the husks from the cobs. It is extremely desirable that these husks be entirely clean and have no husks remaining on them, because the cobs are of value as fuel for the smoking of meats when they are entirely clean and free of husks. With my improved device, the husks remaining on the cobs after the shelling operation are entirely removed and the cobs are in much better condition for sale.

One of the great advantages of my invention is its simplicity and the ease with which it may be attached to the usual type of corn sheller in use today, the general elements of which are disclosed in the drawing.

It will, of course, be understood that various changes may be made in the form, details and arrangement of parts without departing from the scope of the present invention, which, generally stated, consists in the matter shown and described and set forth in the claims.

What is claimed is:—

1. In a corn sheller having a shelling chamber, a corn outlet and a cob outlet, a power-operated drive wheel, a corn-cleaning suction device connected to said shelling chamber, a pulley on said suction device, an independent cob-cleaning suction device, a pulley thereon, a separate fan for each suction device, a conduit from said cob-cleaning suction device to a point outside of the cob outlet, and a belt connecting said drive wheel and said pulleys.

2. In a corn sheller having a shelling chamber, a corn outlet and a cob outlet, a power-operated drive wheel, a corn-cleaning suction device connected to said shelling chamber, a pulley on said suction device, an independent cob-cleaning suction device, a pulley thereon, a separate fan for each suction device, a conduit from said cob-cleaning suction device to a point outside of the cob outlet, and a belt connecting said drive wheel and said pulleys, said drive wheel and pulleys being in alignment in the same plane.

3. In a corn shelling machine, a frame, a shelling chamber in the forward part of said frame, a corn cob outlet at the rear of said chamber, a corn-cleaning suction device connecting with said chamber, a power driven shaft mounted behind said chamber, an independent cob-cleaning suction device comprising auxiliary frame members at one end of said machine frame, a cob-cleaning suction device mounted on said auxiliary frame members, a separate fan for each suction device and a common drive means from said power driven shaft to said corn-cleaning suction device and said cob-cleaning suction device.

4. In a corn sheller, a shelling chamber of greater length than width, a shelling cylinder within said chamber, said cylinder being of greater length than width, a suction device connected to said chamber and having a fan therein adapted to withdraw waste from said shelling chamber, said shelling chamber having an outlet at one end over which cobs will feed after the corn is removed therefrom, a second and separate suction device mounted rearwardly at said first mentioned suction device, a second and separate fan in said suction device, a conduit extending from said suction device to said cob outlet, said outlet including a baffle over which cobs are fed, and the end of said conduit adjacent said outlet being positioned adjacent the upper edge of said baffle.

CLARENCE M. WEINHOLD.